C. H. SMITH, Jr.
HYGROSCOPIC ACTUATED CIRCUIT CLOSER.
APPLICATION FILED APR. 23, 1915.
1,174,188.  Patented Mar. 7, 1916.
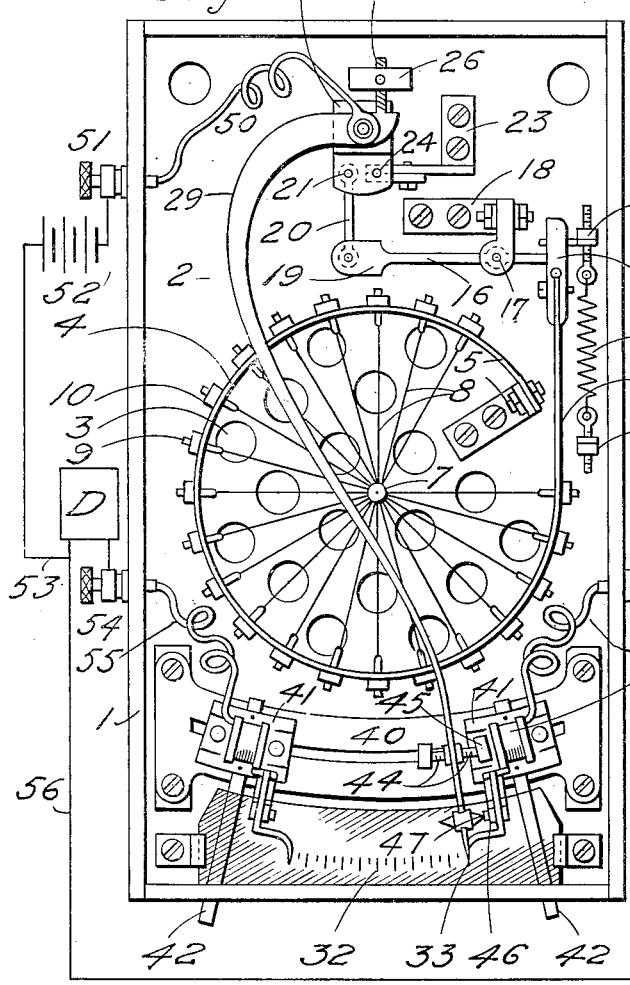
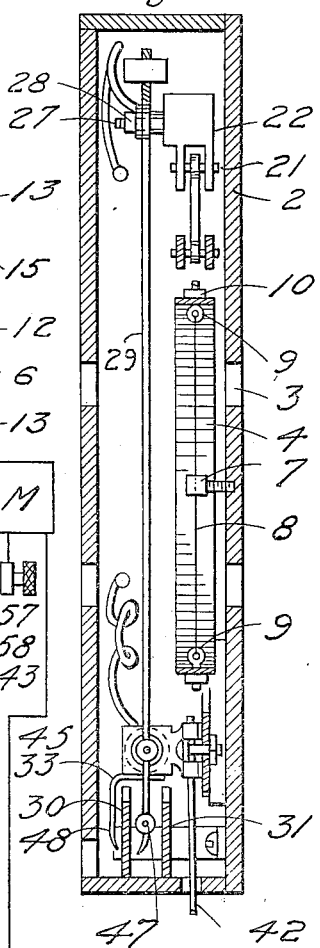
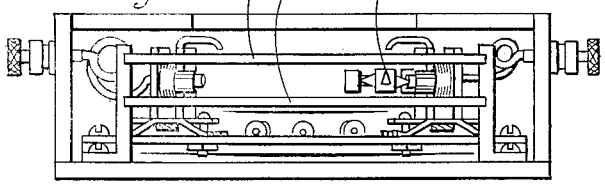
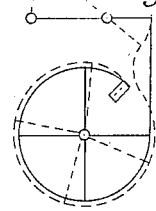
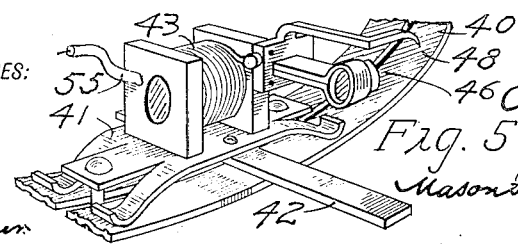
WITNESSES:
A. N. Butler.
N. J. Collamer
INVENTOR:
Charles H. Smith Jr.,
BY
Mason Fenwick & Lawrence,
ATTORNEYS.

UNITED STATES PATENT OFFICE.

CHARLES HARMON SMITH, JR., OF ATLANTA, GEORGIA.

HYGROSCOPIC-ACTUATED CIRCUIT-CLOSER.

1,174,188.  Specification of Letters Patent.  Patented Mar. 7, 1916.

Application filed April 23, 1915. Serial No. 23,478.

*To all whom it may concern:*

Be it known that I, CHARLES H. SMITH, Jr., citizen of the United States, residing at Atlanta, in the county of Fulton and State of Georgia, have invented certain new and useful Improvements in Hygroscopic-Actuated Circuit-Closers; and I do hereby declare the following to be a full, clear, and exact description of the invention, such as will enable others skilled in the art to which it appertains to make and use the same.

This invention relates to electric circuit closers controlled by instruments actuated by atmospheric variations and more especially by those instruments known as hygroscopes; and the object of the invention may be said to be broadly the production of an instrument which will manifest changes in the relative humidity of the atmosphere.

A further object of the invention is to provide means whereby the movement of an index will close an electric circuit, or two circuits alternately at either extreme movement of the index; such means being especially adapted for a slow moving contact in respect to its make and break.

A further object of the invention is to provide means for resetting the position of the stationary contact or contacts so that these elements may be thrown into action sooner or later for different degrees of humidity.

A still further object of the invention is to provide means whereby the unequal expansion and contraction of separate hygroscopic filaments exposing comparatively large surface may be combined and multiplied in a small space so as to be better available for the purposes of this machine.

The invention is carried out in the manner best hereinafter described and claimed, and as shown in the drawings wherein:—

Figure 1 is a front elevation of this machine complete, illustrating the use of two stationary but adjustable contacts, each with its electro-magnet device, in proper relation to a moving contact carried by the index; and this view has been employed to show the index constrained by one of the magnets with one pair of points just making contact with each other, while at the same time depicting the parts of the machine in the position they occupy in extremely dry weather. The other contact is here shown set at the extreme moist position. Fig. 2 is a central vertical sectional view, showing the index in edge elevation throughout its length. Fig. 3 is a bottom plan view of Fig. 1. Fig. 4 is a diagram showing the strip and hygroscopic filaments, or "hairs" as they are called herein, together with the lever arm, all in their extreme positions, the full lines illustrating their extreme dry position and the dotted lines showing their extreme moist position; the relative amount of motion being exaggerated. Fig. 5 is a perspective detail of one of the magnets and the contact point and finger carried thereby.

It often occurs that in pianos, in cases containing cigars, in connection with electro-static fog dispersers, in steam heated rooms, and in other cases too numerous to mention, a demand arises for a machine energized by changes in the relative humidity of the atmosphere which will manifest such changes by its motion in connection with electric contacts or one contact, so that it can of itself automatically cut in elements or mechanisms controlled by means of electricity, such as driers, moisteners, fog-dispersers, indicators, or any other suitable instrument; and generally it is desirable that a scale be provided in conjunction with a moving member or index so that the per cent. of relative humidity present in the air may be read and so that the stationary contact or contacts may be set to act at some known per cent. of relative humidity.

The simplest form of my present invention is that of a hygroscope embodying considerable strength and ample motion to actuate an index carrying an electric contact acting in conjunction with a corresponding contact device, or two of the same; and binding posts or terminals in electric connection with these parts so that suitable wiring may put this machine in circuit with instruments which can be used in connection with it.

In Fig. 1 I have shown a casing 1 with its front removed and its rear wall 2 provided with openings 3 so that the atmosphere has ready access to the interior of the casing and the mechanism therein contained. At about the center of said rear wall is mounted the hygroscopic element which is shown in this view as consisting of a strip 4 which may be of metal, whalebone, or the like, secured at one end at the point 5 to the rear wall 2 and bent around within the casing into a curve with its free end 6 extended into a vertical tangent. At a point approximately in the center of this curve a post 7 projects from the rear wall, to which post is connected a number of hairs 8 radiating therefrom with their outer ends attached to eye-bolts 9 whose shanks pass through the strip 4 and are rendered adjustable by means of nuts 10. I would say at this point that the exact disposition of these hairs is susceptible of a wide variety of modification, and this is also the case with the strip; also, it is not necessary that the strip be curved exactly as shown or lie wholly in one plane, or that its cross-section should be limited to any particular form, square or round. But it is desirable for the purposes of this invention that these parts be so disposed and connected that the linear variation of one or more hair-lines under the influence of variations of moisture shall cause an addition and multiplication in their values to be expressed in the motion of the strip; and the spring to be mentioned later may not be necessary in some of these dispositions. In the disposition of these hairs in Fig. 1, when the hairs are lengthened because of moisture, the free end 6 of the strip will move downward, whereas dryness will cause them to shorten and this free end will move upward. A spring 12 connects this free end with a point beneath it where its tension may be adjustable by any suitable means as 13, and one effect of this spring is to resist the upward movement of the end 6 and to assist the downward movement of the same, while preserving the strip's general shape and properties throughout these motions. Further, this spring communicates its reaction to the strip 4 causing it to impart centrifugal tension to each line of hairs attached thereto, the hairs being restrained by the post 7. This post 7 could be omitted and the hairs connected with each other at this point or simply run across each other as diameters to the strip, but the post is preferable. The tension between the strip and all the hairs may be adjusted all at once by means of adjusting the tension of the spring 12. Thus constrained by the hairs and acted upon by the spring, the strip 4 stands in a state of tension and compression, whether acting upon the hairs only because of its being acted upon by the spring or partly because of its own expansive tension. If the strip 4 has a circular arc where the hairs are attached, its tension will be equally distributed along its length, while the hairs will be equally spaced, preferably far enough to allow the expansive tension to conform to any unequal affection of single hairs. When moisture causes the hairs to expand equally, the strip will expand through concentric arcs except a small part near the fixed end 5 which flexes about that point.

Connected with the free end of the strip is a block 15, herein shown as mounted on one end of a lever 16 which stands substantially at right angles to said free end 6; and nearer the block than the other end of the lever, the latter is pivoted at 17 in a bracket 18 mounted on the rear wall 2. The other end of the lever, which will therefore multiply the motion of the strip, is preferably forked as at 19, and a connecting rod or link 20 pivotally connects said fork with a point 21 within a clamp 22 which is off-center to or eccentric with the point 24 on which said clamp is pivoted in another bracket 23. A post 27 projects forward from said clamp and carries an index 29, the same being detachably and adjustably mounted thereon by means of a nut 28. This index may be of any improved material and construction, but a screw 25 preferably rises from its upper end and carries an adjustable weight 26 which can be moved to counter-balance the index and clamp over the pivot 24. By preference the index is a long light arm which leads down over the front of the hygroscopic features above described so that it will swing clear of them.

I prefer to confine the lower end of the index between two sheets of glass 30 and 31 for the purpose of restricting its path of motion so that its points and armatures may always aline with the stationary points and magnets described below, and one of these sheets of glass may carry or be inscribed with a scale 32 to serve in conjunction with a finger 33 on the index so that the degree of humidity indicated by the position of the index may be read at will.

So much of my machine as has been described will serve as a hygrometer to indicate the degree of humidity in the air, but it is the primary purpose of this invention to employ the same in connection with a drier and a moistener electrically operated through a circuit which is closed by the swinging of the index to either extreme position. It is quite obvious that I might use the moistener alone or the drier alone, but the detailed construction of these devices forms no part of the present invention, and they are therefore only diagrammatically indicated in Fig. 1 at M and D respectively. From a point near the pivot of the index a wire 50 leads to a binding post 51 and thence to a battery 52. From the latter another wire 53 leads to the drier D and thence to a binding post 54 which is connected by a wire 55 with a contact point at one side of the lower end of the index. From said battery wire another wire 56 leads to the moistener M and thence to a binding post 57, and the latter is connected by another wire 58 with a contact point at the other side of the lower end of the index. When now the free end of the index is so shaped that it will make contact with either of said points, it will be obvious that a circuit will be closed through either the drier D or the moistener M. The particular use to which this machine is to be put may make it desirable that these mechanisms D and M or either of them shall not be thrown into action until a certain degree of dryness or dampness is reached, and therefore means are desirable to adjust the position of the points with which the free end of the index contacts. If said mechanisms are of considerable size they may require a strong current to actuate them, and with a slow moving index the circuit will not always be closed quickly. Lest this result in the forming of arcs or sparks at the points of contact, means are desirable to cause the forming of the contact or the breaking of the same rather quickly. The provision of such means also prevents the vibration of a delicately mounted instrument which would produce a fluttering contact and set up high resistance. In order to provide means for avoiding the objections and accomplishing the ends just stated, I therefore employ an improved form of circuit closer on one or both sides of the index, as will now be explained.

Mounted in the lower part of the casing is a curved track 40 on which moves a carriage 41 rendered adjustable along the track by any suitable means such as a handle 42 which may be extended from the carriage downward through a slot in the casing as best seen in Fig. 2. Mounted on but insulated from the carriage is an electromagnet 43 with which the wire 58 connects. (I am describing the right hand magnet shown in Fig. 1, but there may be two magnets on the track as also therein illustrated.) Carried by the index 29 is a double screw 44 on whose extremities are adjustably mounted armatures 45 adapted to be attracted by the core of either magnet when the latter is energized. Depending from the magnet is a contact point 46, and the lower end of the index carries a double contact point 47. The magnet or the carriage will also carry a finger 48 overlying the forward glass plate and scale 32, so that the carriage and all parts thereon may be adjusted with nicety. With this construction, when the index swings to a point near one extreme of its movement, its point 47 contacts (at first gently) with the point 46 so that a circuit is closed which in the illustration given in Fig. 1, is through the moistener M. This circuit generates magnetism in the core of the magnet 43, and the armature 45 is therefore attracted toward it; and the result is that the points 47 and 46 are then thrown into forceful or reliable contact. Hence arcing, sparking and fluttering are avoided, and the circuit will remain closed until atmospheric conditions change to such an extent that the hygroscopic element imparts a considerable force tending to move the index. When the latter moves it will then jump away from the magnet far enough to break the arc. If this magnet be duplicated at the other end of the track 40, the construction and result are the same except that the drier D will be thrown into action when the index swings to that extreme of its movement; but, as above suggested, it is quite possible to omit either magnet or both, or it might be that permanent magnets could be employed instead of electro-magnets as described.

What I claim is:

1. In a circuit closer, the combination with a relatively fixed magnet, and a point carried thereby and out of line with its core; of a pendant swinging member, and an armature and point mounted thereon near its free end, said points contacting before the armature contacts with the core of the magnet.

2. In a circuit closer, the combination with a relatively fixed electro-magnet, and a point carried thereby out of line with its core and in series with the winding of the magnet; of a relatively movable member, an armature and point thereon opposite the magnet core and its point, said points being arranged to contact with each other before the armature contacts with the core, and a circuit from the magnet through a source of electrical energy to said member, for the purpose set forth.

3. In a circuit closer, the combination with two spaced electro-magnets, and a point on each in circuit with its winding; of a swinging member whose free end stands between said magnets, a double point on such end adapted to contact alternately with the points on the magnets, two armatures adjustably carried by said end opposite the magnet poles, and a circuit leading from said member through a source of energy, and then divided and leading to said magnet windings.

4. The combination with a swinging index, a finger projecting from its free end, a scale along which said finger moves, and a contact point and armature carried by the index; of a magnet whose core is in line with said armature, a point mounted on the magnet adapted to contact with that on the index, and a finger on the magnet with which that on the index is adapted to aline when the armature is in contact with the core, for the purpose set forth.

5. The combination with a movable member, and means for swinging it under varying humidifying atmospheric conditions; of a track over which the free end of said member moves, a contact point adjustably carried by said track, a second contact point on the member adapted to make electrical contact with the first-named point, and a circuit including said points, a source of energy, and a device for altering the conditions of the atmosphere.

6. The combination with a movable member, and means for swinging it under varying humidifying atmospheric conditions; of a track over which the free end of said member moves, a carriage adjustably mounted on said track, an electro-magnet on the carriage, a contact point projecting from the magnet, a second point projecting from the movable end of said member and adapted to contact with the first-named point, an armature carried by this member opposite the core of said magnet, and a circuit including said member, both points, the magnet, a source of energy, and a device for altering the atmospheric conditions.

7. The combination with a movable member, and means for swinging it under varying humidifying atmospheric conditions; of a track over which the free end of said member moves, a carriage adjustably mounted on said track, a magnet carried by the carriage, a contact point carried by the magnet, a spring finger carried by the free end of said member and having a point adapted to make electrical contact with the first-named point, an armature on said member opposite the core of said magnet, and an electric circuit leading from said member through a source of energy and a device for altering the humidifying condition of the air, through the magnet, and to the carriage for the purpose set forth.

8. The combination with a pendant pivoted index, and means for swinging it to one side or the other under varying humidifying atmospheric conditions; of a finger carried by the free end of said index and having outwardly facing contact points, spaced points with which those on the finger are adapted to contact, spaced magnets into whose field of attraction said index swings at its extremes of movement, means for adjusting the position of said spaced points, and separate electric circuits including them, for the purpose set forth.

9. The combination with a casing, a pendant index pivoted at its upper end within said casing, a hygroscopic element carried within the casing, one end thereof being fixed and the other end movable, and connections between its movable end and the index near the pivot of the latter; of a track within the casing over which the free end of the index moves, a carriage slidably mounted on said track, a handle leading from the carriage out of the casing, contact points on the index and carriage adapted to contact with each other, and an electric circuit including said points, for the purpose set forth.

10. The herein described hygroscopic element consisting of a curved strip having one end secured to a fixed support and the other end movable, an indicator connected with said movable end, and a series of hairs within the strip attached to its sides.

11. The herein described hygroscopic element consisting of a curved member having one end secured to a fixed support and the other end movable, an indicator connected with said movable end, and a series of hairs within the member, each attached at its outer end thereto and at its inner end to a fixed support.

12. The herein described hygroscopic element consisting of a curved strip having one end secured to a fixed support and the other end movable, an indicator connected with said movable end, a post mounted on a fixed support within the curve, and a series of hairs connected with the post at their inner ends and adjustably connected with said strip at their outer ends.

13. The herein described hygroscopic element consisting of a curved strip secured at its inner end to a fixed support and having its movable outer end projecting substantially upward, hygroscopic filaments for contracting and expanding said strip under varying humidifying atmospheric conditions, a contractile spring leading from the movable end of the strip downward to a support, an indicator, and connections between said movable end and indicator, for the purpose set forth.

In testimony whereof I affix my signature in presence of two witnesses.

CHARLES HARMON SMITH, Jr.

Witnesses:
FRANK A. OGLESBY,
N. V. JOHNSON.